United States Patent [19]

Komatsu et al.

[11] Patent Number: 4,542,934
[45] Date of Patent: Sep. 24, 1985

[54] FRONT BODY CONSTRUCTION FOR MOTOR VEHICLE

[75] Inventors: Nobuhiro Komatsu; Minoru Fujimoto; Kazuyuki Hirata, all of Hiroshima; Makoto Yamane, Higashihiroshima, all of Japan

[73] Assignee: Mazda Motor Corporation, Hiroshima, Japan

[21] Appl. No.: 465,484

[22] Filed: Feb. 10, 1983

[30] Foreign Application Priority Data

Mar. 8, 1982 [JP] Japan ............................. 57-36936

[51] Int. Cl.$^4$ ............................................. B62D 25/08
[52] U.S. Cl. ...................................... 296/194; 296/178; 296/29; 280/668; 280/710
[58] Field of Search ............... 296/192, 193, 194, 195, 296/187, 188, 29, 30; 280/668, 710

[56] References Cited

U.S. PATENT DOCUMENTS

| | | | |
|---|---|---|---|
| 3,188,132 | 6/1965 | Schwiering et al. | 296/194 |
| 3,279,782 | 10/1966 | Schick | 280/668 |
| 3,462,168 | 8/1969 | Gebler | 280/668 |
| 3,541,668 | 11/1970 | Wessells et al. | 296/193 |
| 4,270,793 | 6/1981 | Harasaki et al. | 296/192 |
| 4,332,187 | 6/1982 | Imai et al. | 296/192 |

FOREIGN PATENT DOCUMENTS

| | | | |
|---|---|---|---|
| 1530796 | 6/1969 | Fed. Rep. of Germany | 296/192 |
| 0063970 | 5/1980 | Japan | 296/194 |

Primary Examiner—Randolph A. Reese
Assistant Examiner—Dennis H. Pedder
Attorney, Agent, or Firm—Burns, Doane, Swecker & Mathis

[57] ABSTRACT

A compact and light front body construction for a motor vehicle, in which a pair of suspension towers are increased in strength. In the construction, each of a pair of wheel aprons is divided into upper and lower wheel-aprons and the lower wheel-apron has a projecting portion such that the suspension tower is formed by the projecting portion and an upper panel attached to an upper face of the projecting portion. Furthermore, the upper wheel-apron has a closed cross section such that the upper panel is secured to an underside of the upper wheel-apron.

3 Claims, 7 Drawing Figures

FRONT BODY CONSTRUCTION FOR MOTOR VEHICLE

BACKGROUND OF THE INVENTION

The present invention generally relates to motor vehicles and more particularly, to a front body construction for a front engine motor vehicle.

Commonly, since a pair of suspension towers disposed at opposite transversal sides of a body of the motor vehicle and at a front portion thereof are subjected to external loads from front wheels, etc., they are generally required to have a relatively high strength.

In order to increase the strength of the suspension towers, for example, Japanese Utility Model Publication (Jitsukosho) No. 2490/1979 discloses a front body construction in which intermediate portions of the respective spring houses (suspension towers) in the vertical direction of the body are coupled with the front deck through a panel. However, in the above described known construction, each of the outer side edges of the upper face portions of the spring houses is secured to each of the upper faces of the opposite side members (air ducts) of the body by spot welding, which outer side edges are, respectively, disposed outwardly in the sidewise direction of the body. Accordingly, in the case where an external load oriented in the sidewise direction of the body, i.e. a transversal load, is applied to the spring houses, the application of the load is oriented in the shearing direction with respect to the joint area, so that the spring houses have a sufficiently large strength against the load. On the other hand, in the case where an external load oriented in the vertical direction of the body, i.e. a vertical load is applied upwardly to the spring houses, the application of the load is oriented in such a direction as to detach each of the outer side edges of the upper face portions of the spring houses from each of the upper faces of the opposite side members. Thus, the prior art front body construction as described above has the disadvantage that the suspension houses have an insufficient strength against upward vertical loads.

SUMMARY OF THE INVENTION

Accordingly, an essential object of the present invention is to provide an improved front body construction for a motor vehicle, in which a pair of suspension towers have a large strength against not only transversal loads but vertical loads, with substantial elimination of the disadvantages inherent in conventional front body constructions of this kind.

Another important object of the present invention is to provide an improved front body construction of the above described type which is compact in size and light in weight.

Still another object of the present invention is to provide an improved front body construction of the above described type which is highly reliable in actual use, suitable for mass production at low cost, and can be readily incorporated into motor vehicles and the like at low cost.

In accomplishing these and other objects according to one preferred embodiment of the present invention, there is provided an improved front body construction for a motor vehicle having a frame structure extending in the longitudinal direction of a body of said motor vehicle, said front body construction comprising: first and second upper wheel-aprons which constitute said frame structure; and first and second lower wheel-aprons which constitute said frame structure; said first and said second upper wheel-aprons defining, in cooperation with said first and second lower wheel-aprons, a pair of opposite side walls of an engine room disposed at a front portion of said body, respectively; said first and said second lower wheel-aprons having first and second projecting portions extending inwardly in the sidewise direction of said body, respectively such that said first and said second projecting portions form a pair of first and second suspension towers for accommodating and supporting a pair of first and second suspension members therein, respectively; said first and said second suspension towers having first and second upper faces, respectively; said first and said second upper faces having first and second outer side edge portions disposed outwardly in the sidewise direction of said body, respectively such that said first and said second outer side edge portions are, respectively, secured to lower faces of said first and said second upper wheel-aprons.

In accordance with the present invention, since each of the outer side edge portions of the upper faces of the suspension towers is secured to each of the lower faces of the upper wheel-aprons, the suspension towers have a large rigidity against not only transversal loads but vertical loads.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
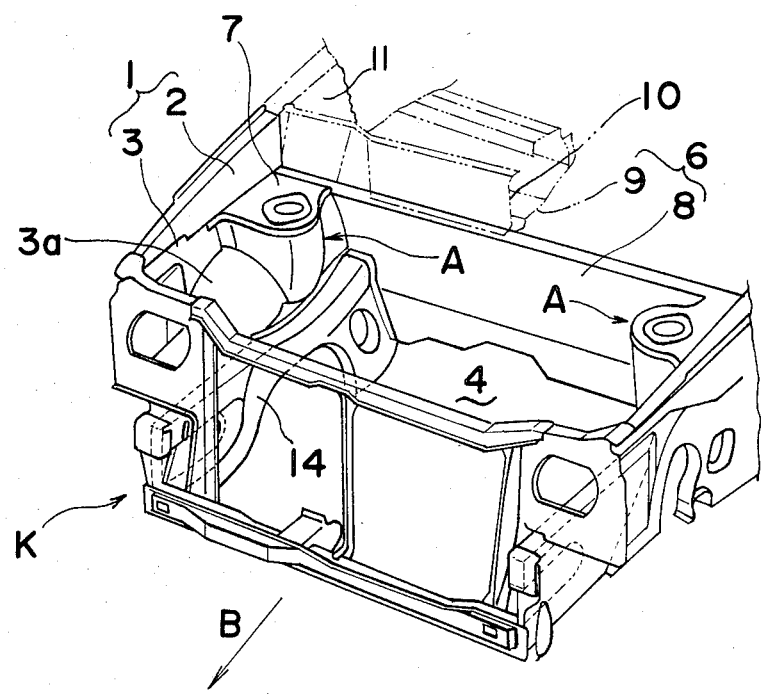
FIG. 1 is a perspective view of a front body construction for a motor vehicle, according to a preferred embodiment of the present invention.
Figure 2:
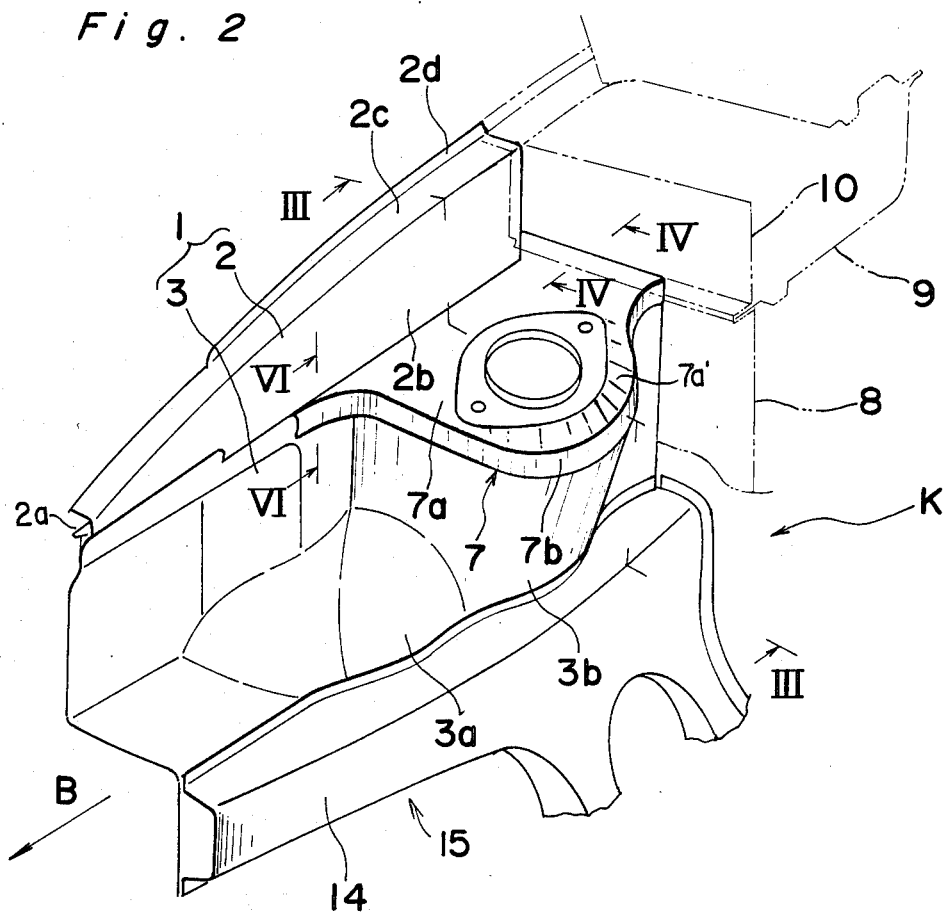
FIG. 2 is a perspective view showing, on a large scale, a main part of the front body construction of FIG. 1.

Referring now to the drawings, there is shown in FIGS. 1 to 7, a front body construction K for a motor vehicle, according to a preferred embodiment of the present invention.

It should be noted here that, since the front body construction K is symmetrical with respect to the longitudinal center line of a body of the motor vehicle, only one side of opposite transversal sides of the front body construction K will be described for brevity, hereinbelow.

It is to be further noted that the motor vehicle is arranged to run forwardly in the direction of the arrow B in FIGS. 1, 2, 4, 5 and 7 and have a frame structure extending in the longitudinal direction of the body.

The front body construction K generally includes a wheel apron 1, a wheel-apron reinforcement 5, a dash panel 6, and an upper panel 7. The wheel apron 1 is vertically divided into an upper wheel-apron 2 and a lower wheel-apron 3 which constitute the frame structure extending in the longitudinal direction of the body at a front portion of the body. The upper wheel-apron 2 and the lower wheel-apron 3 define one of opposite side walls of an engine room 4 disposed at a front portion of the body. The upper wheel-apron 2 has a substantially U-shaped cross section and has a lower horizontal portion 2a, an intermediate vertical portion 2b, an upper horizontal portion 2c and a bent side edge portion 2d formed sequentially in this order. More specifically, the lower horizontal portion 2a has an inner side edge disposed inwardly in the sidewise direction of the body such that the intermediate vertical portion 2b extends upwardly and substantially in the vertical direction of the body from the inner side edge of the lower horizontal portion 2a. The upper horizontal portion 2c extends outwardly in the sidewise direction of the body from an upper edge of the intermediate vertical portion 2b. The bent side edge portion 2d extends outwardly in the sidewise direction of the body from an outer side edge of the upper horizontal portion 2c so as to be inclined obliquely and upwardly. Thus, the wheel-apron reinforcement 5 is attached to the lower horizontal portion 2a and the bent side edge portion 2d so as to form a closed cross section.

The lower wheel-apron 3 has a first lower panel or tire house portion 3a disposed slightly forwardly of the dash panel 6, and a projecting portion 3b which extends inwardly in the sidewise direction of the body at a position of a suspension tower A disposed adjacent to the tire house portion 3a. The suspension tower A is formed by the projecting portion 3b and the upper panel 7 attached to an upper edge portion 3b' of the projecting portion 3b.

Figure 3:
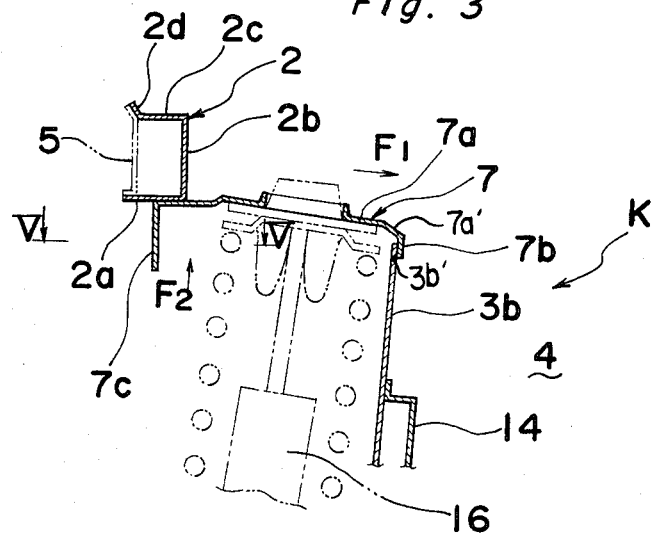
FIG. 3 is a cross-sectional view taken along the line III—III in FIG. 2.
Figure 7:
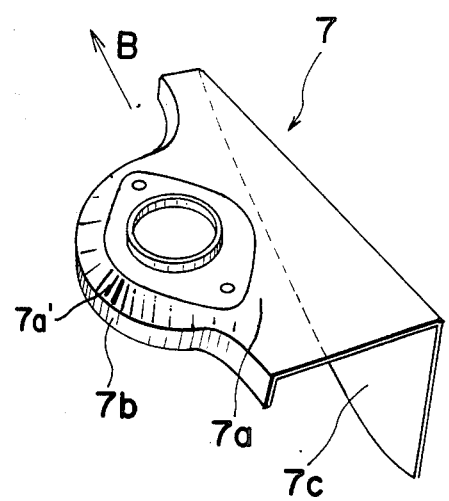
FIG. 7 is an enlarged perspective view of an upper panel employed in the front body construction of FIG. 1.

As shown in FIG. 7, the upper panel 7 has a generally horizontal portion 7a, a bent portion 7b and a reinforcing skirt portion 7c. The horizontal portion 7a is arranged to cover an upper opening of the projecting portion 3b of the lower wheel-apron 3. As seen in FIG. 3, the outer side edge of portion 7a is secured to a lower face of lower horizontal portion 2a. The bent portion 7b is formed by bending an inner side edge portion of the horizontal portion 7a so as to extend downwardly such that the bent portion 7b is secured to the upper edge portion 3b' of the projecting portion 3b, which inner side edge portion of the horizontal portion 7a is disposed inwardly in the sidewise direction of the body. The reinforcing skirt portion 7c is formed by bending an outer side edge portion of the horizontal portion 7a so as to extend downwardly and substantially in the vertical direction of the body, which outer side edge portion of the horizontal portion 7a is disposed outwardly in the sidewise direction of the body. More specifically, as shown in FIG. 3, it is so arranged that the horizontal portion 7a extends inwardly in the sidewise direction of the body so as to be inclined obliquely and downwardly such that a damper 16 of an suspension apparatus is supported by the horizontal portion 7a and that a boundary portion 7a' between the horizontal portion 7a and the bent portion 7b extends inwardly in the sidewise direction of the body so as to be inclined obliquely and downwardly at a larger angle of inclination than that of the remaining portion of the horizontal portion 7a.

Figure 4:
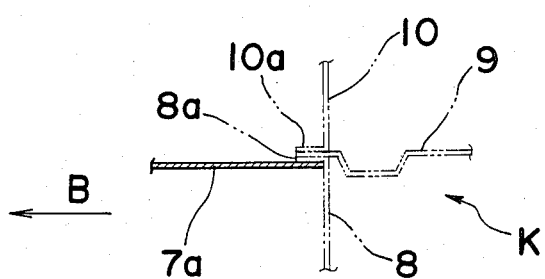
FIG. 4 is a cross-sectional view taken along the line IV—IV in FIG. 2.
Figure 6:
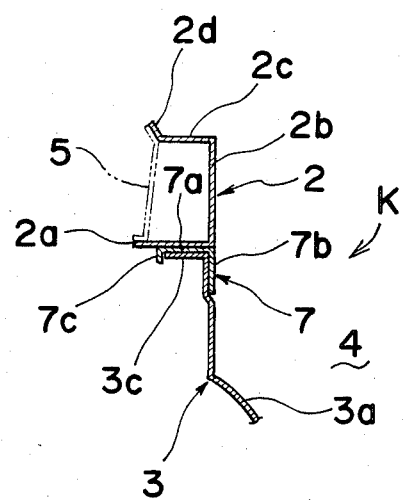
FIG. 6 is a cross-sectional view taken along the line VI—VI in FIG. 2.

The dash panel 6 includes a lower dash panel 8 and an upper dash panel 9. As shown in FIG. 4, an upper face of a rear edge portion of the horizontal portion 7a is directly secured to a lower face of an upper horizontal flange portion 8a of the lower dash panel 8. Furthermore, a flange of the upper dash panel 9 and a lower horizontal portion 10a of a baffle plate 10 are sequentially secured to an upper face of the upper horizontal portion 8a. Meanwhile, as shown in FIG. 6, a front end portion of the horizontal portion 7a is formed to be small in width and is attached to an upper horizontal portion 3c of the lower wheel-apron 3. Namely, the front end portion of the horizontal portion 7a of the upper panel 7 is interposed between a lower face of the lower horizontal portion 2a of the upper wheel-apron 2 and an upper horizontal portion 3c formed by bending an upper end of the lower wheel-apron 3 substantially in the horizontal direction of the body so as to be secured therebetween.

Figure 5:
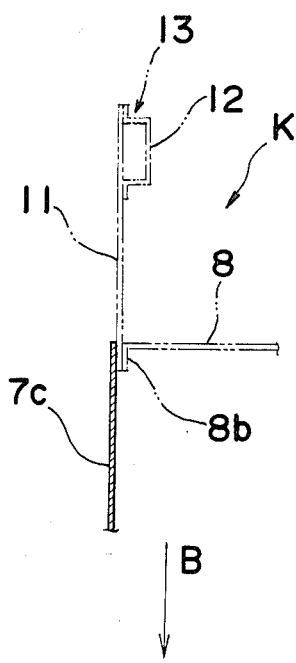
FIG. 5 is a cross-sectional view taken along the line V—V in FIG. 3.

Moreover, as shown in FIG. 7, a lower edge of the reinforcing skirt portion 7c is arranged to extend rearward in the longitudinal direction of the body so as to be inclined obliquely and downwardly. As shown in FIG. 5, an inner face of a rear edge portion of the reinforcing skirt portion 7c, disposed inwardly in the sidewise direction of the body, is attached to an outer face of a front edge portion of a cowl side panel 11, which outer face is disposed outwardly in the sidewise direction of the body. Furthermore, a side vertical portion 8b of the lower dash panel 8 is secured to an inner face of the front edge portion of the cowl side panel 11, which inner face is disposed inwardly in the sidewise direction of the body, whereby the suspension tower A is increased in strength. Meanwhile, a pillar panel 12 of substantially U-shaped cross section is attached to the cowl side panel 11 so as to form a hinge pillar 13.

Referring back to FIGS. 1 and 2, an inner panel 14 is secured to an underside of the lower wheel-apron 3 so as to constitute a front frame 15 of downwardly closed cross section extending in the longitudinal direction of the body.

By the above described arrangement of the front body construction K, in the case where external loads are applied to the suspension apparatus from the front wheels, etc., the external loads are transmitted to the suspension tower A through the damper, etc. In the case where the loads are applied to the suspension tower A in the sidewise direction of the body, i.e. in the direction of the arrow $F_1$ in FIG. 3, the application of the loads is oriented in the shearing direction with respect to the joint area (joint faces) between the upper wheel-apron 2 and the upper panel 7 and thus, the suspension tower A has a sufficient rigidity against the transversal loads.

On the other hand, in the case where the external loads are applied to the suspension tower A upwardly in the vertical direction of the body, i.e. in the direction of the arrow $F_2$ in FIG. 3, the loads are applied to the suspension tower A in the compression direction with respect to the above described joint area, so that the suspension tower A also has a large rigidity against the vertical loads.

Accordingly, since the joint area, especially a portion of the joint area considered to have an extremely small coupling force by the use of spot welding is not subjected to loads oriented in such a direction as to detach the joint area, the suspension tower A has a relatively high strength against the external loads.

Furthermore, since the reinforcing skirt portion 7c of the upper panel 7 is attached to the cowl side panel 11 and the rear edge portion of the horizontal portion 7a is directly attached to the lower dash panel 8, an area surrounding the suspension tower A is increased in rigidity and strength so as to remarkably decrease vibration and noise during running of the motor vehicle.

As is clear from the foregoing description, in accordance with the present invention, since the wheel apron is vertically divided into the upper wheel-apron and the lower wheel-apron such that the outer side edge portion of the upper panel in the suspension tower structure is secured to the underside of the upper wheel-apron, the joint area between the upper panel and the upper wheel-apron is not subjected to the loads (forces) oriented in such a direction as to detach the joint even when the transversal loads or the vertical loads are applied to the suspension tower, whereby the suspension tower has been remarkably increased in strength.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A front body construction for a motor vehicle having a frame structure extending in the longitudinal direction of a body of said motor vehicle, said front body construction comprising:

first and second upper wheel-aprons which constitute a portion of said frame structure;

first and second lower wheel-aprons which constitute a portion of said frame structure;

said first and second upper wheel-aprons defining, in cooperation with said first and second lower wheel-aprons, a pair of opposite side walls of an engine room disposed at a front portion of said body;

said first and second upper wheel-aprons each having a U-shaped cross section and constituting, in cooperation with first and second wheel-apron reinforcements secured to open portions of said first and second upper wheel-aprons, respectively, first and second frame members of closed cross section extending in the longitudinal direction of said body;

said first and second upper wheel-aprons each having a lower horizontal portion, an intermediate vertical portion and an upper horizontal portion formed sequentially in this order so as to constitute a substantially U-shaped cross section;

said lower horizontal portion having an inner side edge disposed inwardly in the sidewise direction of said body such that said intermediate vertical position extends upwardly and substantially in the vertical direction of said body from said inner edge of said lower horizontal portion;

said upper horizontal portion extending outwardly in the sidewise direction of said body from an upper edge of said intermediate vertical portion;

said lower horizontal portion and said upper horizontal portion of each of the upper wheel aprons being secured to one of said first and second wheel-apron reinforcements such that a closed cross-section is formed by each of said first and second upper wheel-aprons and the corresponding one of said first and second wheel-apron reinforcements;

said first and second lower wheel-aprons including first and second lower panels and first and second upper panels, respectively;

said first and second lower panels having first and second projecting portions, respectively, extending inwardly in the sidewise direction of said body;

said first and second upper panels being secured to upper portions of said first and second projecting portions, respectively, for defining first and second suspension towers in cooperation with said first and second projecting portions;

said first and second upper panels having first and second outer side edge portions, respectively, disposed outwardly in the sidewise direction of said body such that said first and second outer side edge portions are secured to a lower face of each of said lower horizontal portions of said first and second upper wheel-aprons, respectively; and first and second dash panels which are disposed rearwardly of said first and second upper panels, respectively, and have first and second flange portions attached to each other and extending in the sidewise direction of said body, respectively, such that rear edge portions of said first and second upper panels are secured to a face of said first flange portion.

2. A front body construction as claimed in claim 1, further including first and second cowl side panels, said first and second upper panels each having a reinforcing skirt portion formed by downwardly bending said first and second outer side edge portions, respectively, such that rear ends of each of said reinforcing skirt portions and an outer face of each of said first and said second cowl side panels and of side vertical portions of said first dash panel are secured together with each said outer face extending in the vertical direction of said body.

3. A front body construction as claimed in claim 1, wherein each of said first and said second upper panels has a front end portion disposed forward in the longitudinal direction of said body and formed small in width relative to the remainder of the upper panel, each of said first and second lower wheel-aprons having an upper horizontal portion formed by bending an upper end of each of said first and second lower wheel-aprons, said front end portion of each of said first and said second upper panels being interposed between said upper horizontal portion of each of said first and second lower wheel-aprons and a lower horizontal portion of each of said first and second upper wheel-aprons so as to be secured therebetween.

* * * * *